(12) United States Patent
Ikeda (10) Patent No.: US 9,867,270 B2
(45) Date of Patent: Jan. 9, 2018

(54) ELECTROMAGNETIC WAVE EMISSION DEVICE

(71) Applicant: IMAGINEERING, INC., Hyogo (JP)

(72) Inventor: Yuji Ikeda, Kobe (JP)

(73) Assignee: IMAGINEERING, INC., Kobe (JP)

( * ) Notice: Subject to any disclaimer, the term of this patent is extended or adjusted under 35 U.S.C. 154(b) by 142 days.

(21) Appl. No.: 14/439,028

(22) PCT Filed: Oct. 24, 2013

(86) PCT No.: PCT/JP2013/078878
§ 371 (c)(1),
(2) Date: Sep. 24, 2015

(87) PCT Pub. No.: WO2014/069337
PCT Pub. Date: May 8, 2014

(65) Prior Publication Data
US 2016/0007437 A1     Jan. 7, 2016

(30) Foreign Application Priority Data

Oct. 29, 2012  (JP) ................................. 2012-238424

(51) Int. Cl.
*H05H 1/46* (2006.01)
*H05B 6/70* (2006.01)
(Continued)

(52) U.S. Cl.
CPC .............. *H05H 1/46* (2013.01); *F02B 23/08* (2013.01); *F02M 27/04* (2013.01); *F02P 3/01* (2013.01);
(Continued)

(58) Field of Classification Search
CPC .. F02P 13/00; F02P 15/04; F02P 9/007; F02P 3/02; F02P 15/08; F02P 23/04;
(Continued)

(56) References Cited

U.S. PATENT DOCUMENTS

2011/0030660 A1*  2/2011  Ikeda .................. F02B 1/02
                                                          123/536

FOREIGN PATENT DOCUMENTS

JP    2002-164198 A    6/2002
WO    2012-105569 A2   8/2012
(Continued)

OTHER PUBLICATIONS

International Search Report dated Feb. 10, 2014 issued in corresponding application No. PCT/JP2013/078878.

*Primary Examiner* — Hung Q Nguyen
*Assistant Examiner* — Xiao Mo
(74) *Attorney, Agent, or Firm* — Bacon & Thomas, PLLC (57) ABSTRACT

The purpose of the present invention is to provide an electromagnetic wave emission device in which the destination to which an electromagnetic wave is supplied can be switched among a plurality of emission antennas, wherein there are no problems such as breakage of a switching element even in a case where a large-power electromagnetic wave is emitted. The present invention is an electromagnetic wave emission device characterized by the following: an electromagnetic wave output from an electromagnetic wave generator is distributed to a plurality of emission antennas, and then from among the plurality of emission antennas, a target antenna having plasma nearby is supplied with an electromagnetic wave distributed to the target antenna and all or part of the electromagnetic waves reflected by the emission antennas other than the target antenna; and the all or part of the electromagnetic waves distributed to the target antenna and all or part of the electromagnetic waves supplied to the target antenna after reflection by the emission antennas other than the target antenna are emitted from the target antenna to the plasma.

10 Claims, 5 Drawing Sheets

(51) Int. Cl.
    *H05B 6/72*     (2006.01)
    *H05B 6/80*     (2006.01)
    *F02P 23/04*     (2006.01)
    *F02P 3/01*     (2006.01)
    *F02B 23/08*     (2006.01)
    *H01T 13/50*     (2006.01)
    *F02M 27/04*     (2006.01)
    *H05B 6/68*     (2006.01)

(52) U.S. Cl.
    CPC ............ *F02P 23/045* (2013.01); *H01T 13/50* (2013.01); *H05B 6/686* (2013.01); *H05B 6/70* (2013.01); *H05B 6/705* (2013.01); *H05B 6/72* (2013.01); *H05B 6/802* (2013.01); *H05H 2001/463* (2013.01); *Y02T 10/125* (2013.01)

(58) Field of Classification Search
    CPC ...... F02P 23/045; F02M 27/04; F02B 23/101; H05H 1/46
    See application file for complete search history.

(56) References Cited

FOREIGN PATENT DOCUMENTS

| | | | |
|---|---|---|---|
| WO | 2012-105570 | A1 | 8/2012 |
| WO | 2012-111701 | A2 | 8/2012 |
| WO | 2012-124671 | A2 | 9/2012 |

\* cited by examiner

ELECTROMAGNETIC WAVE EMISSION DEVICE

TECHNICAL FIELD

The present invention relates to an electromagnetic wave emission device that emits electromagnetic wave to plasma.

BACKGROUND ART

There is known an electromagnetic wave emission device that emits electromagnetic waves to plasma (see JP 2007-113570A). The electromagnetic wave emission device that is described in JP 2007-113570A equips an ignition device that generates a plasma discharge by emitting microwave to a combustion chamber prior to or after the ignition of air-fuel mixture. The ignition device generates a local plasma using discharge of a spark plug so that the plasma is generated in the high-pressure environment, and enhances this plasma using microwave. The local plasma is generated at a discharge gap between a ground terminal part and a tip part of an anode terminal.

PRIOR ART DOCUMENTS

Patent Documents

Patent Document 1: JP 2007-113570A

THE DISCLOSURE OF THE INVENTION

Problems to be Solved by the Invention

In some cases, multiple emission antennas are connected to a single electromagnetic wave generation device via a distribution device. This distribution device switches the emission antenna for supplying the electromagnetic wave by using switching elements such as diode. For purpose of plasma enlargement, for example, the electromagnetic wave that has a large electric power shall be emitted from the emission antenna when the electromagnetic wave generation device is used for enlarging plasma. However, the switching element may damage because of the large electric power electromagnetic wave that flows into the distribution device.

The present invention has been made in view of the above described circumstances, and the objective is to provide an electromagnetic wave generation device that can switch the supply destination of the electromagnetic wave among the multiple emission antennas, and that does not cause malfunction such as the switching element damages even when the electromagnetic wave of large electric power is emitted.

Means for Solving the Problems

The present disclosure relates to an electromagnetic wave emission device comprising: a plurality of emission antennas that emits the electromagnetic waves outputted from the electromagnetic wave generation device; and a transmission system including an electromagnetic wave transmission line that prolongs from an output terminal of the electromagnetic wave generation device and that branch to a plurality of the branching lines. Each of the plurality of the branching line connects to the emission antenna. The transmission system is configured such that the electromagnetic wave is supplied to a target antenna. The target antenna is an antenna where the plasma exists in the neighbor. To the target antenna, provided are; (i) the electromagnetic wave distributed for the target antenna and (ii) all or part of electromagnetic wave reflected in an antenna that is different from the target antenna. What is emitted from the target antenna to the plasma are; (i) all or part of electromagnetic wave that is distributed to the target antenna; and (ii) all or part of electromagnetic wave that is reflected in the antenna that is different from the target antenna.

According to the electromagnetic wave generation device of the present invention, the distributed electromagnetic wave reflects at the emission antenna which plasma does not exist in its neighbor. The distributed electromagnetic wave and the reflected electromagnetic wave are emitted to the plasma by the above-mentioned target antenna where the plasma exists in its neighbor. Therefore, the electromagnetic waves generation device of the present invention can switch the supplying destination of the electromagnetic wave among the plurality of the emission antenna even when the switching element is not equipped.

The electromagnetic wave emission device of the present invention is characterized in that the switching element is not connected to the branching line.

Preferably, the electromagnetic wave emission device of the present invention has a control part that controls an oscillation frequency of the electromagnetic wave generation device such that the electromagnetic wave energy reflected by the target antenna becomes small. The electromagnetic wave emission device of the present invention can supply energy efficiently to the plasma because the oscillating frequency can be controlled so that the electromagnetic wave energy reflected by the target antenna is reduced. This contributes to a cost reduction.

Preferably, the branching line includes a stub for performing an impedance matching. A control part shall be also equipped for controlling the stub included in the branching line connected to the target antenna among the stubs so that the electromagnetic wave energy reflected by the target antenna becomes small. The electromagnetic wave emission device of the present invention can supply energy efficiently to the plasma because the stub can be controlled so that the electromagnetic wave energy reflected by the target antenna is reduced. This contributes to cost reduction.

Preferably, in the electromagnetic wave emission device of the present invention, the plurality of the emission antenna is provided in each of the combustion chamber which equips a spark plug. The spark plug shall be arranged such that a spark is generated in the neighbor of the emission antenna. The spark timings of the spark plugs shall be shifted among the plurality of the combustion chamber. The emission antenna of the combustion chamber, where the spark is generated, becomes a target antenna when the electromagnetic wave emission device outputs the electromagnetic wave that synchronizes the spark timing of the spark plug of the combustion chamber, and the target antenna shall be switched when a sparking spark plug is switched. This configuration of the electromagnetic wave emission device of the present invention allows a convenient control of the combustion timing in each combustion chamber when it is applied to an automobile engine.

Preferably, in the electromagnetic wave emission device of the present invention, the plurality of the emission antennas is arranged so that the passage timing of the flame during the flame propagation differs mutually in the combustion chamber. The emission antenna, where the flame passes, becomes a target antenna among the plurality of the emission antennas when the electromagnetic wave generation device outputs the electromagnetic wave during the flame propagation, and the target antenna shall be switched conforming to the flame propagation. This configuration of the electromagnetic wave emission device of the present invention can promote the flame propagation in the combustion chambers and can improve the combustion efficiency when it is applied to an automobile engine.

Preferably, in the electromagnetic wave emission device of the present invention, the center electrode of the spark plug functions as an emission antenna. The structure inside the spark plug can be simplified because the center electrode functions as an emission antenna.

Preferably, $L=n\lambda/4$ shall be satisfied; where L stands for a distance between the branching point that branches to the plurality of the branching lines of the transmission system to the emission tip of the electromagnetic wave in the emission antenna; $\lambda$ stands for the wavelength of the in the branching line; and n stands for natural number. This configuration of the electromagnetic wave emission device of the present invention allows improves emission efficiency from each emission antennas.

The electromagnetic wave emission device of the present invention can have a structure such that the distance between the branching point that branches to a plurality of the branching lines of the transmission system and the emission tip of the electromagnetic wave in the emission antenna differs among the plurality of the emission antennas.

Advantage of the Invention

According to the electromagnetic wave emission device of this disclosure, the supplying destination of the electromagnetic wave can be switched appropriately even when there is no switching element. Thus, use of this electromagnetic wave emission device allows reducing the loss due to damages of the switching elements even when high electric power electromagnetic wave is emitted.

DETAILED DESCRIPTION

In the following, a detailed description will be given by an embodiment of the present invention with reference to the accompanying drawings. It should be noted that the following embodiments are merely preferable examples, and do not limit the scope of the present invention, applied field thereof, or application thereof.

First Embodiment

The present embodiment relates to internal combustion engine 10 equipping electromagnetic wave emission device 13 of the present invention. Internal combustion engine 10 is a reciprocating type internal combustion engine where piston 23 reciprocates. Internal combustion engine 10 includes internal combustion engine body 11, ignition device 12, electromagnetic wave emission device 13, and control device 35. The combustion cycle i.e. ignition of air-fuel mixture using ignition device 12 and combustion of the air-fuel mixture are performed repeatedly in internal combustion engine 10.

Internal Combustion Engine Body

Figure 1:
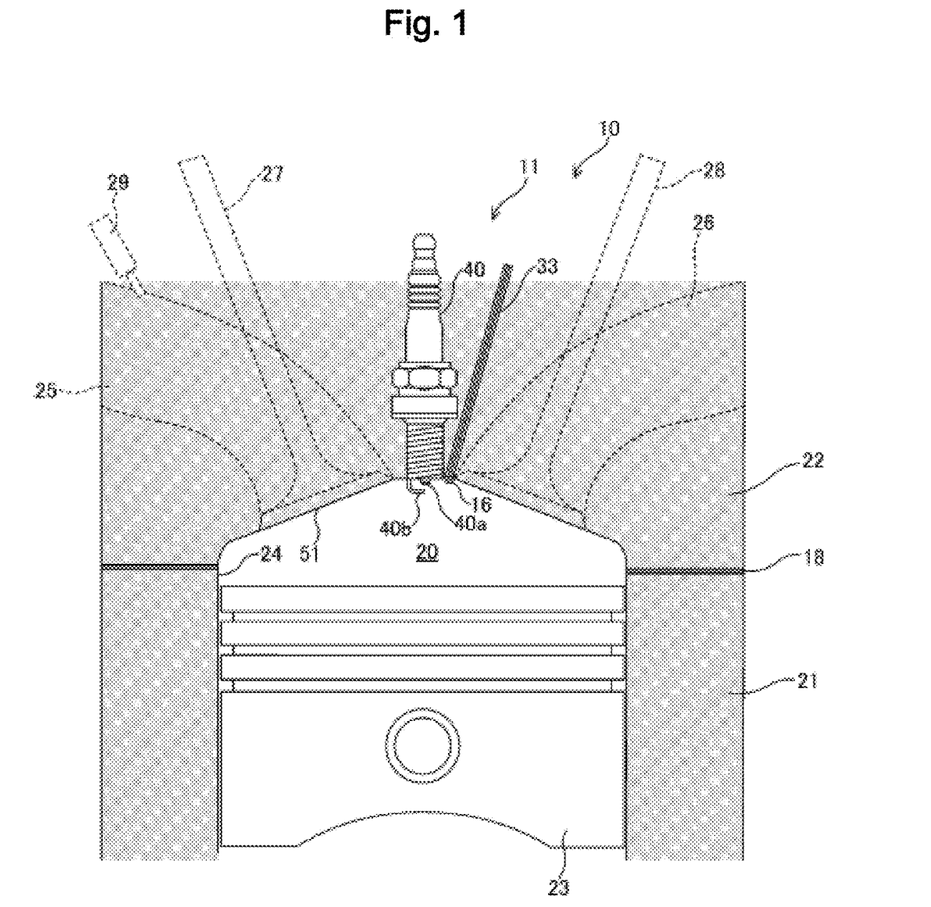
FIG. 1 is a vertical sectional view of an internal combustion engine according to a first embodiment.

As shown in FIG. 1, internal combustion engine body 11 includes cylinder block 21, cylinder head 22 and piston 23. Multiple cylinders 24 having circular cross sections are formed in cylinder block 21. Piston 23 is formed in each cylinder 24 so as to reciprocate freely. Piston 23 is connected to a crankshaft via a connecting rod (not illustrated). The crankshaft is supported by cylinder block 21 so as to rotate freely. When piston 23 reciprocates in the axial direction of cylinder 24 in each cylinder 24, the connecting rod converts a reciprocation of piston 23 to a rotation of the crankshaft.

Cylinder head 22 is placed on cylinder block 21 so as to sandwich a gasket 18. Cylinder head 22 constitutes a compartment portion that defines combustion chamber 20 having a circular section together with cylinder 24, piston 23, and gasket 18. The diameter of combustion chamber 20 is, for example, approximately a half of the wavelength of the microwave emitted to combustion chamber 20 from electromagnetic wave emission device 13.

Figure 2:
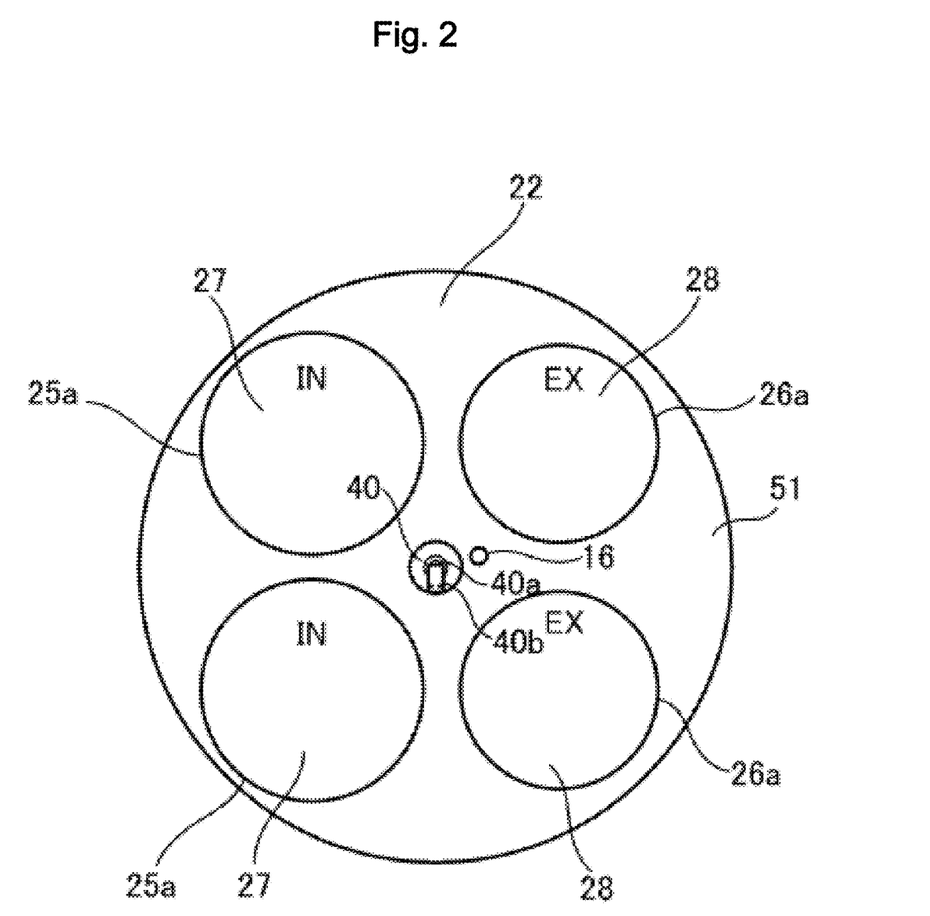
FIG. 2 is a front view of the ceiling surface of the internal combustion engine according to the first embodiment.

In cylinder head 22, spark plug 40 constituting ignition device 12 is formed in each cylinder 24. Tip part of spark plug 40, exposing to combustion chamber 20, is located in the central part of ceiling side 51 (a surface of cylinder head 22 that faces combustion chamber 20) of combustion chamber 20 as shown in FIG. 2. The periphery of the tip part of spark plug 40 is circular when it is viewed from the axial side. Center electrode 40a and earth electrode 40b are formed in the tip part of spark plug 40. The discharge gap is formed between the tip of center electrode 40a and tip part of earth electrode 40b.

Inlet port 25 and exhaust port 26 are formed for each cylinder 24 in cylinder head 22. Air intake valve 27 that opens and closes air intake side opening 25a of inlet port 25, and injector 29 that injects fuel are arranged in inlet port 25. Exhaust valve 28 that opens and closes exhaust gas side opening 26a of exhaust port 26 is formed in exhaust port 26. In internal combustion engine 10, inlet port 25 is designed so that a strong tumble flow is formed inside combustion chamber 20.

Ignition Device

Figure 3:
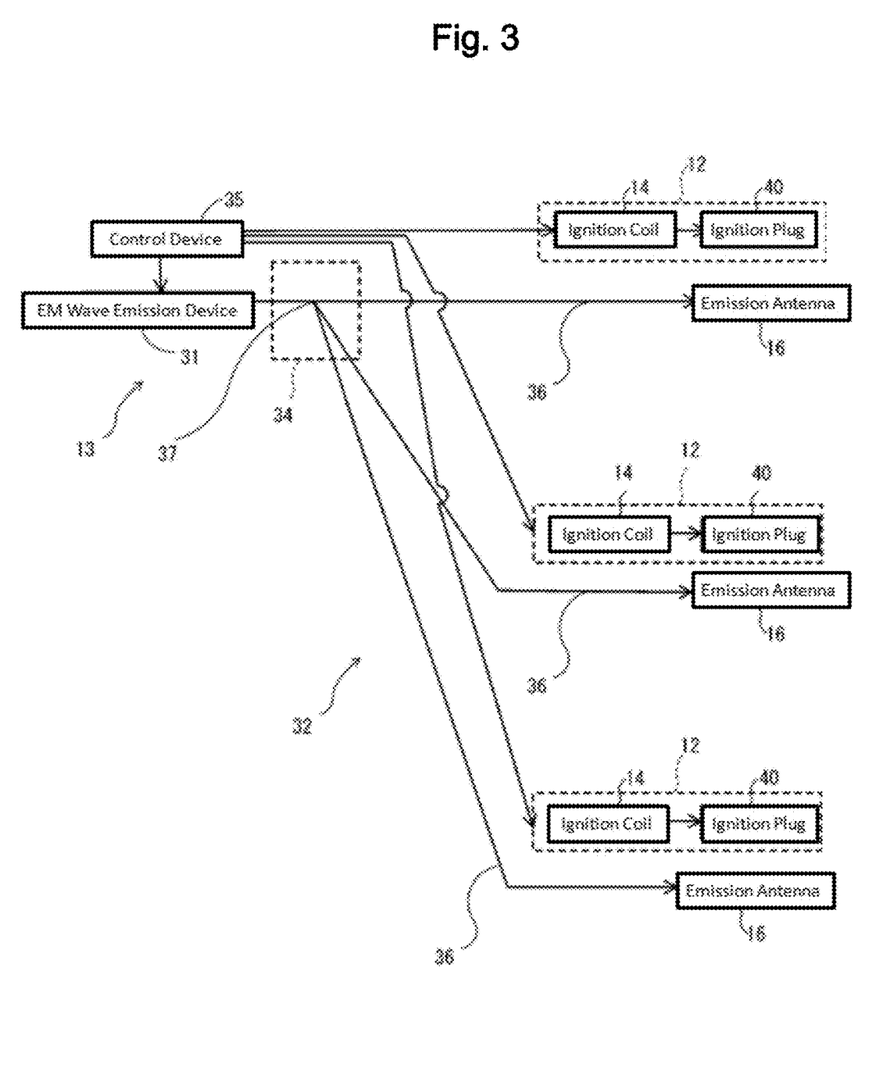
FIG. 3 is a block diagram of an electromagnetic wave emission device and the ignition device according to the first embodiment.

Ignition device 12 is provided for every combustion chamber 20. As shown in FIG. 3, each ignition device 12 includes ignition coil 14 that outputs high-voltage pulse, and spark plug 40 to where high-voltage pulse outputted from ignition coil 14 is supplied.

Ignition coil 14 is connected to DC (Direct Current) power supply (not illustrated). Ignition coil 14 amplifies the voltage applied from the DC power supply when an ignition signal is received from control device 35. Then the amplified high-voltage pulse is outputted to center electrode 40a of spark plug 40. When the high-voltage pulse is applied to center electrode 40a, the dielectric breakdown occurs in the discharge gap and spark discharge arose in spark plug 40. Discharge plasma is generated in the discharge pass of the spark discharge.

Electromagnetic Wave Emission Device

As shown in FIG. 3, electromagnetic wave emission device 13 includes electromagnetic wave generation device 31, transmission system 32, and multiple emission antennas 16

Electromagnetic wave generation device 31 outputs microwave pulses repetitively with a predetermined duty ratio when an electromagnetic wave drive signal is received from control device 35. Electromagnetic wave drive signal is a pulse signal. Electromagnetic wave generation device 31 outputs microwave pulses repetitively during the pulse width period of the electromagnetic wave drive signal. A semiconductor oscillator generates microwave pulses in electromagnetic wave generation device 31. Other types of oscillators, such as magnetron can be used instead of a semiconductor oscillator.

Emission antenna 16 is formed on ceiling side 51 of combustion chamber 20. Emission antenna 16 is formed near spark plug 40 on ceiling side 51 of combustion chamber 20. Each emission antenna 16 is insulated electrically from cylinder head 22.

Emission antenna 16 is electrically connected to branching unit 34 through transmission line 33 of the microwave laid inside cylinder head 22.

Transmission system 32 is configured such that the microwave outputted from electromagnetic wave generation device is transmitted to multiple emission antennas 16. As shown in FIG. 3, transmission line of the microwave is prolonged from the output terminal of an electromagnetic wave generation device and is branched to multiple branching lines 36 corresponding to multiple emission antennas 16. Each branch lines 36 are connected to emission antenna 16, i.e. an emission antenna corresponding to the branching line). In transmission system 32, some transmission lines including the branching point 37 branched to multiple branching line 36 are accommodated in branching unit 34. In FIG. 3, branching unit 34 is indicated with wavy line.

Transmission system 32 does not have a distribution device that switches the emission antenna, which will be a supplying destination of microwave, among multiple emission antennas using of a switching element. That is, the switching element is not connected to each branching line.

Figure 4:
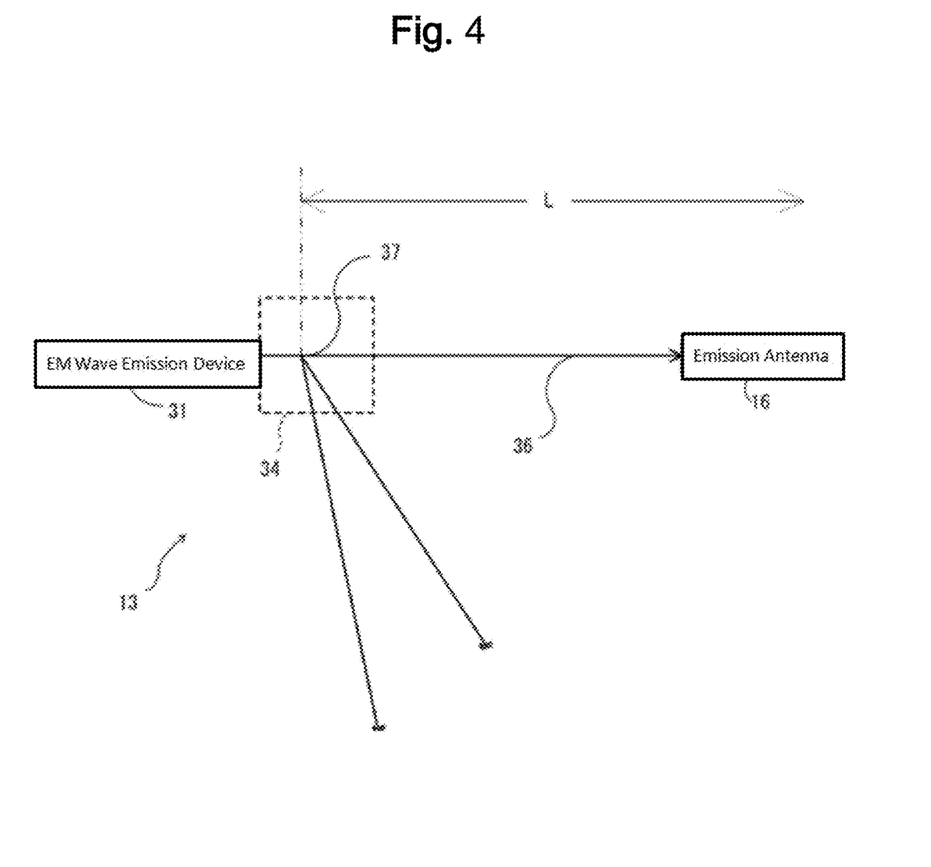
FIG. 4 is a schematic view of the electromagnetic wave emission device according to the first embodiment.

As shown in FIG. 4, the total sum value L of the length of branching line 36 and the length of the emission antenna, i.e. the length from branching point 37 to the tip of emission antenna 16, satisfies eq. 1 shown below. The same antennas are used for all of multiple antennas 16.

$$L = \lambda/4 * n \quad \text{(eq. 1)}$$

In eq. 1, λ stands for electric length of microwave in branching line 36 and n stands for natural number. In the present embodiment, the total sum values of the lengths of branching line 36 and emission antenna 16 differs mutually among multiple branching lines 36. The length of each branching line 36 is set as to increase this total sum such that n increases in increment of one from the shortest branching lines 36 and the longest branching lines 36 (in other words, the total sum value of the lengths of branching line 36 and emission antenna 16 shall be increased in increment of λ/4).

The electromagnetic wave generation device 31 has three emission antennas 16, i.e. first antenna, second antenna, and third antenna in this embodiment, but the number of the emission antennas can be two, or can be equal to or more than four. First branching line is connected to first antenna, second branching line is connected to second antenna, and third branching line is connected to third antenna. Total length L1 of the first branching line and the first antenna, total length L2 of the second branching line and the second antenna, and total length L3 of the third branching line and the third antenna satisfies eq. 2.

$$L1 + (\lambda/4)*2 = L2 + (\lambda/4)*2 = L3 \quad \text{(eq. 2)}$$

Operation of the Control Device

Operation of control device 35 will be discussed.

Control device 35 determines the ignition timing of each combustion chamber 20 from a control map based on the operating condition of internal combustion engine 20, and controls each ignition device 12 provided for each combustion chamber 20 and electromagnetic wave emission device 13 formed one by one for multiple combustion chambers 20. The ignition timings are shifted mutually between each combustion chamber 20.

Control device 35 outputs an ignition signal to ignition device 12 provided in combustion chamber 20, i.e. the combustion chamber where the first antenna is arranged, when the ignition timing is approached. When ignition device 12 receives an ignition signal, the spark discharge occurs in the discharge gap of spark plug 40 as mentioned above.

Control device 35 outputs an electromagnetic wave drive signal to electromagnetic wave emission device 13 corresponding to the output timing of the ignition signal. For example, the drive signal is outputted simultaneously with the output timing of the ignition signal, immediately after this output timing, or after a predetermined period from the ignition timing. The output timing of the electromagnetic wave drive signal can be adjusted suitably according to the condition of combustion area. When the electromagnetic wave drive signal is received, electromagnetic wave generation device 31 outputs microwave pulses repetitively during the electromagnetic wave emission period. Control device 35 outputs the electromagnetic wave drive signal to electromagnetic wave emission device 13 corresponding to the output timing of the ignition signal for each of multiple combustion chambers 20.

The microwave emitted from electromagnetic wave generation device 31 branches to multiple emission antennas 16 at branching point 37 of transmission system 32. Among the multiple emission antennas 16, in emission antenna 16 where the plasma (spark discharge or flame) exists nearby, microwave is not emitted (this kind of emission antenna 16 is referred to as "target antenna"). On the other hand, in the other emission antenna 16 where the plasma does not exist nearby, microwave is not emitted and reflective wave is seen.

Hereafter, a first antenna refers to an antenna where the plasma due to spark discharge exists near the tip part of the antenna, and second and third antennas that are different from the first antenna refers to the antennas where the spark does not exist near the tip part of the antenna. The first, second, and third antennas are located in, for example, in first, second and third cylinder respectively. In this case, the distance between the tip part of the first antenna and the plasma is extremely short compared to the electrical length of the microwave because the plasma exists near the tip part of the first antenna. Therefore, it can be assumed that the plasma which is a load exists near the tip part of the first antenna.

The energy can be distributed efficiently to each transmission lines that correspond to first, second and third antennas when the impedance of a power supply and a microwave source, and the impedance of a load circuit are equal. For example, when the impedance of the power supply is 50 ohms, the maximum output can be supplied when the impedance of the load circuit is 50 ohms. The impedance of the load circuit corresponding to the tip of the first antenna is 50 ohms because the plasma exists at the tip of the first antenna and the plasma does not exist at the tips of the second and third antennas. On the contrary, the impedance of the load circuit corresponding to the second and third antennas becomes infinity. Therefore, the energy is supplied to the first antenna while the energy is not supplied to the second antenna and third antenna. As a result, the transmitted microwave is reflected and is supplied to the first antenna.

The microwave distributed to the first antenna is absorbed by the plasma because the plasma exists near the first antenna. On the contrary, the plasma does not exist near the tip of the second antenna and third antennas, and the reflected microwave is thus supplied to the first antenna via branching point 37. As a result, the microwave distributed to the first antenna and the microwave reflected at emission antennas 16 are provided to the first antenna. Thus, the energy of the microwave outputted from electromagnetic wave generation device 31 is concentrated on the first antenna. In this case, the above mentioned equations 1 and 2 are satisfied so that the reflective waves from the second and third antennas are emitted efficiently from the first antenna.

The microwave distributed to the first antenna and the microwave supplied to the first antenna, after the reflection at the second antenna and third antenna, are emitted from the first antenna to the plasma. Plasma enlarges by absorbing the microwave energy. A lean air-fuel mixture is ignited by this enlarged plasma. In combustion chamber 20, the flame spreads from the position where the air-fuel mixture is ignited.

When the other combustion chamber 20, e.g. the second cylinder provided with the second antenna encounters an ignition timing, control device 35 outputs an ignition signal to ignition device 12 located in combustion chamber 20 and outputs electromagnetic wave drive signal to electromagnetic wave emission device 13. In combustion chamber 20, spark discharge occurs by ignition device 12. The microwave is emitted from the second antenna where the plasma such as spark discharge or flame exists in the neighbor among the multiple emission antennas 16, while the microwave turns to be a reflection wave and is not emitted from the first and third antennas where the plasma does not exist in the neighbor. The microwave energy that is outputted from electromagnetic wave generation device 31 is concentrated on the second antenna. The microwave distributed to the second antenna, and the microwave supplied to the second antenna after the reflection at the emission antennas other than the second antenna, are emitted to plasma from the second antenna.

Control device 35 is controlled so that the ignition timing of ignition device 12 can be shifted mutually between each cylinder, and is controlled so that electromagnetic wave is emitted from emission antenna 16 from an adequate cylinder according to the ignition timing.

Advantage of the First Embodiment

In the present embodiment, the microwave energy outputted from one electromagnetic wave generation device 31 can be concentrated to one emission antenna 16 (target antenna) without use of branching device, and the microwave energy can be supplied to plasma from this emission antenna 16. That is, when the electromagnetic wave is outputted from electromagnetic wave generation device 31 and is emitted from emission antenna 16, the electromagnetic wave is absorbed by the plasma and the plasma is enlarged in the cylinder, among all cylinders, where the plasma such as spark discharge and flame exists in combustion chamber 20. In the cylinder where the plasma does not exists, the electromagnetic waves outputted from electromagnetic wave generation device 31 is not emitted from emission antenna 16 and reflects to branching point 37 as a reflective wave. This reflective wave is emitted from emission antenna 16 of a cylinder where the plasma exists, and can promote the enlargement of this plasma. The electromagnetic wave emission device according to the present embodiment can thus switch the supplying destination of the electromagnetic waves among multiple emission antennas even when a switching element is not equipped. Therefore, the use of the electromagnetic wave emission device of this embodiment avoids a loss due to damage of switching element even when the high power electromagnetic wave is emitted.

Second Embodiment

The present embodiment relates to internal combustion engine 10 comprising electromagnetic wave emission device 13 of the present invention as well as the first embodiment. In this embodiment multiple emission antennas 16 are provided in a single combustion chamber 20 in contrast to the first embodiment.

In combustion chamber 20, multiple emission antennas 16 are arranged on the ceiling surface 51 of combustion chamber 20 so that the flame front, which is spreading from the neighbor of the spark plug, passes near the antenna at different timing.

Figure 5:
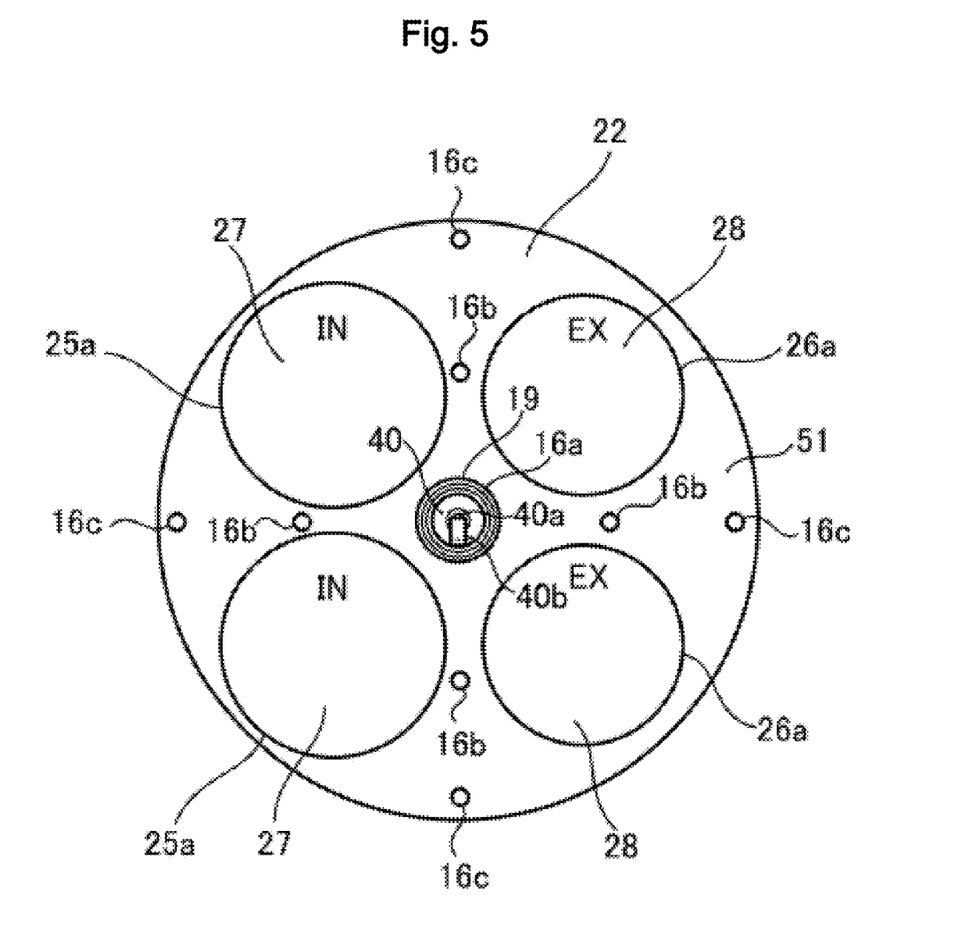
FIG. 5 is a front view of the ceiling surface of the internal combustion engine according to the second embodiment.

In this embodiment, nine emission antennas 16 are provided in combustion chamber 20. The number of emission antennas 16 can be eight or less, or can be ten or more. Emission antenna 16a is located near the spark plug. The location or geometry of emission antenna 16a shall not be limited specifically as long as this antenna is provided near the spark plug. However, this antenna can be a ring like formed as shown in FIG. 5 so as to surround the center electrode. Emission antenna 16b is located on a concentric circle centered by the spark plug and is located in the inner wall side of combustion chamber 20 compared to emission antenna 16a. The emission antenna 16c is located on the concentric circle centered by the spark plug and is located further in the inner wall side of combustion chamber 20 compared to emission antenna 16b. The flame front that spreads from the neighbor of the spark plug passes emission antennas 16a, 16b, and 16c in this order.

Control device 35 outputs an ignition signal to ignition device 12 located in combustion chamber 20 when the ignition timing approaches. In ignition device 12, the spark discharge occurs in the discharge gap of spark plug 40 when the ignition signal is received. Control device 35 outputs an electromagnetic wave drive signal to electromagnetic wave emission device 13 in accordance with the output timing of the ignition signal (for example, the electromagnetic wave drive signal is output ted simultaneously with the output timing of the ignition signal, immediately after the output timing, or a predetermined time after the output timing). Electromagnetic wave generation device 31 repetitively outputs the microwave pulse when the electromagnetic wave drive signal is received.

In the multiple emission antennas 16, microwave is emitted from emission antenna 16a, where the plasma (spark discharge) exists near emission antenna 16, while the microwave is reflected at emission antennas 16b and 16c where the plasma does not exists in the neighbor. The microwave energy outputted from electromagnetic wave generation device 31 is concentrated on emission antenna 16a. The microwave distributed to emission antenna 16a and the microwave supplied to emission antenna 16a after reflection at an emission antennas other than emission antenna 16a are emitted from emission antenna 16a to plasma. Plasma absorbs microwave energy emitted from emission antenna 16a and enlarges. The lean air-fuel mixture is ignited by this enlarged plasma. The flame front spreads from this air-fuel ignition position in combustion chamber 20.

In this embodiment, electromagnetic wave generation device 31 continuously outputs the microwave pulse at least until the flame front finishes passing emission antenna 16c. The microwave energy outputted from electromagnetic wave generation device 31 thus concentrates on emission antenna 16b when the flame passes emission antenna 16b. In this case, microwave is emitted only from emission antenna 16b. The flame velocity increases when the flame receives microwave energy from emission antenna 16b. When the flame passes emission antenna 16c, the microwave energy outputted from electromagnetic wave generation device 31 is concentrated on emission antenna 16c, and microwave is emitted only from emission antenna 16c. The flame velocity increases when the flame receives microwave energy from emission antenna 16c.

The output maintenance time of the microwave from electromagnetic wave generation device 31 can be predetermined or the output of the microwave from electromagnetic wave generation device 31 can be suspended after the flame is detected to be passed the emission antenna 16c using the measurement result of microwave reflectance in each emission antenna. For example, electromagnetic wave emission device 13 determines that the flame finished passing emission antenna 16c when the reflectance of the microwave in all emission antennas 16 exceeds a predetermined threshold value for a predetermined period based on the measurement result of the microwave reflectivity in each emission antennas 16, and then suspends the microwave output from electromagnetic wave generation device 31.

The microwave energy (power) outputted from electromagnetic wave generation device 31 can be reduced while the flame front does not pass any of emission antennas 16b or 16c based on the measurement result of the microwave reflectivity in each emission antenna 16. For example, electromagnetic wave emission device 13 reduces microwave energy outputted from electromagnetic wave generation device 31, when the microwave reflectivity exceeds predetermined threshold value.

Advantage of the Second Embodiment

According to this embodiment, the emission antenna for emitting the microwave is switched automatically in accordance with the movement of flame front. Therefore, the microwave can promote the flame propagation with a convenience structure.

Other Embodiment

In each of above embodiments, control device 35 can control oscillation frequency of electromagnetic wave generation device 31 so that the reflected electromagnetic wave energy in the target antenna becomes small. In combustion chamber 20, in which the plasma exists near emission antenna 16, not all electromagnetic wave that is outputted from electromagnetic wave generation device 31 is not emitted from emission antenna 16 (target antenna), and some of them becomes a reflection wave depending on a condition of the pressure or temperature inside the combustion chamber, or intensity of existing plasma. Control part 35 of electromagnetic wave emission device of this embodiment may detect the reflection wave energy and control the frequency of the electromagnetic waves that is generated from the electromagnetic wave generation device so that the energy of the reflective wave becomes small. In this case, electromagnetic wave generation device 31 is configured so that the oscillating frequency can be adjusted continuously between a first setting value f1 (f1=f−X) in a lower frequency and a second setting value f2 (f2=f+X) in a higher frequency centering frequency f=2.45 GHz. X (Hz) is between several to several tens (Hz). Control device 35 scans the frequency of microwave when electromagnetic wave generation device 31 receives the electromagnetic wave drive signal. Control device 35 sets the oscillating frequency of microwave to a frequency where the reflectance of the microwave becomes the minimum in the target antenna (here, the target antenna refers to an antenna where the plasma exists in the neighbor, and specifically the antenna where the reflectance of microwave becomes the minimum among the multiple emission antennas). Electromagnetic wave emission device 13 can have multiple electromagnetic wave generation devices 31 whose oscillating frequencies are mutually different and the frequency of the microwave emitting to combustion chamber 20 can be adjusted by switching the active electromagnetic wave generation device 31.

In this embodiment, the electromagnetic wave energy can be absorbed efficiently in accordance with the fluctuating plasma when control device 35 controls the oscillation frequency of electromagnetic wave generation device 31 so that electromagnetic waves reflected in the target antenna becomes small.

The other embodiments can be contemplated. Center electrode 40a of spark plug 40 of the above-mentioned embodiment may serve as the emission antenna of electromagnetic waves. Center electrode 40a of the spark plug 40 is connected electrically to the output terminal of a mixing circuit. This mixing circuit receives a high-voltage pulse from ignition coil 14 and an electromagnetic wave from electromagnetic wave generation device 31 from separate input terminals and outputs the high-voltage pulse and the electromagnetic wave from the same output terminal.

Emission antenna 16 may be covered by an insulator or a dielectric in the above-mentioned embodiment. Receiving antenna 52 may be covered by the insulator or the dielectric.

Multiple emission antennas 16 may be arranged on the piston top or on the gasket. The geometry of emission antenna 16 can be a ring-like form.

INDUSTRIAL APPLICABILITY

According to the electromagnetic wave emission device of the present invention, the supplying destination of the microwave can be switched among the multiple emission antennas even when no switching element exists. Therefore, the use of this electromagnetic wave emission device can reduce a loss due to damage of the switching element even when the high power electromagnetic wave is emitted. This electromagnetic wave emission device can be used conveniently as an electromagnetic wave emission device which emits electromagnetic waves to plasma in combustion chambers of gasoline engines or diesel engines.

EXPLANATION OF REFERENCE NUMERALS

10 Internal combustion engine
11 Internal combustion engine body

12 Ignition device
13 Electromagnetic wave emission device
16 Emission antenna
20 Combustion chamber
35 Control device

The invention claimed is:

1. An internal combustion engine having a combustion chamber, a spark plug, and an electromagnetic wave emission device, comprising:
   an electromagnetic wave generation device;
   a plurality of emission antennas each adapted to emit an electromagnetic wave outputted from the electromagnetic wave generation device, wherein; the plurality of the emission antennas are provided within the combustion chamber; and
   a transmission system including an electromagnetic wave transmission line that extends from an output terminal of the electromagnetic wave generation device to a plurality of branching lines, wherein each of the plurality of the branching line connects to a respective one of the plurality of emission antennas; wherein
   the transmission system is configured such that:
   (1) the electromagnetic wave is supplied to a target antenna, wherein the target antenna is one of the plurality of emission antennas where a plasma exists in the vicinity thereof, and the electromagnetic wave supplied to the target antenna is emitted to the plasma,
   (2) the electromagnetic wave is supplied to an other antenna, wherein the other antenna is one of the plurality of emission antennas where no plasma exists in the vicinity thereof, and the electromagnetic wave supplied to the other antenna is reflected and not emitted by the other antenna, and
   (3) the reflected electromagnetic wave is provided to the target antenna and emitted by the target antenna to the plasma.

2. The internal combustion engine as claimed in claim 1, wherein no switching element is connected to the branching line.

3. The internal combustion engine as claimed in claim 1, further comprising:
   a control part that controls an oscillation frequency of the electromagnetic wave generation device such that the electromagnetic wave energy reflected by the target antenna becomes small.

4. The internal combustion engine as claimed in claim 1, wherein;
   the spark plug is arranged such that a spark is generated in the neighbor of the emission antenna;
   the spark timings of the spark plugs are shifted among the plurality of the combustion chamber; and
   one of the plurality of emission antennas of the combustion chamber, where the spark is generated, becomes a target antenna when the electromagnetic wave emission device outputs the electromagnetic wave that synchronizes the spark timing of the spark plug of the combustion chamber, and the target antenna is switched when the sparking spark plug is switched.

5. The internal combustion engine as claimed in claim 1, wherein;
   the plurality of the emission antennas are arranged so that the passage timing of the flame during the flame propagation differs mutually in the combustion chamber; and
   the emission antenna, where the flame passes, becomes a target antenna among the plurality of the emission antennas when the electromagnetic wave generation device outputs the electromagnetic wave during the flame propagation, and the target antenna switches conforming to the flame propagation.

6. The internal combustion engine as claimed in claim 1, wherein a center electrode of a spark plug functions as an emission antenna.

7. The internal combustion engine as claimed in claim 1, wherein $L=n \times \lambda/4$ is satisfied; where L stands for the distance between the branching point that branches to the plurality of the branching lines in the transmission system and the emission tip of the electromagnetic wave in the emission antenna; $\lambda$ stands for wavelength of the in the branching line; and n stands for the natural number.

8. The internal combustion engine as claimed in claim 7, wherein the distance between the branching point that branches to the plurality of the branching lines of the transmission system and the emission tip of the electromagnetic wave in the emission antenna differs among the plurality of the emission antennas.

9. The internal combustion engine as claimed in claim 1, wherein one of said plurality of antennas becomes said target antenna when an impedance of a power supply, the electromagnetic wave generation device and a load circuit of the antenna are equal.

10. The internal combustion engine as claimed in claim 1, wherein a proximity of the target antenna to the plasma results in an impedance of the target antenna which is substantially lower than an impedance of the other antenna.

* * * * *